United States Patent
Zhao

(10) Patent No.: US 10,932,228 B2
(45) Date of Patent: Feb. 23, 2021

(54) COMMUNICATION METHOD AND TERMINAL

(71) Applicant: HUAWEI TECHNOLOGIES CO., LTD., Shenzhen (CN)

(72) Inventor: Zhenshan Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 20 days.

(21) Appl. No.: 16/368,824

(22) Filed: Mar. 28, 2019

(65) Prior Publication Data
US 2019/0230631 A1 Jul. 25, 2019

Related U.S. Application Data

(63) Continuation of application No. PCT/CN2016/100600, filed on Sep. 28, 2016.

(51) Int. Cl.
*H04W 4/40* (2018.01)
*H04W 72/02* (2009.01)
(Continued)

(52) U.S. Cl.
CPC ....... *H04W 72/02* (2013.01); *H04W 72/0453* (2013.01); *H04W 4/40* (2018.02); *H04W 88/02* (2013.01)

(58) Field of Classification Search
CPC ....... H04W 72/02; H04W 72/04; H04W 4/40; H04W 88/02
(Continued)

(56) References Cited

U.S. PATENT DOCUMENTS 6,052,557 A 4/2000 Kinnunen et al.
8,213,405 B2 * 7/2012 Horn ............... H04J 3/0679
370/350
(Continued)

FOREIGN PATENT DOCUMENTS

CN 1146345 A 4/1997
CN 103514637 A 1/2014
(Continued)

OTHER PUBLICATIONS

Qualcomm Incorporated:"Co-channel coexistence for DSRC and LTE—V2V", 3GPP Draft; R1-166268, vol. RAN WG1, No. Gothenburg, Sweden;Aug. 22, 2016-Aug. 26, 2016, Aug. 21, 2016, XP51125308; 6 pages.
(Continued)

*Primary Examiner* — Man U Phan
(74) *Attorney, Agent, or Firm* — Kilpatrick Townsend & Stockton LLP

(57) ABSTRACT

Embodiments of the present invention relate to a communication method and a terminal. The method includes: receiving, by a first terminal, first information on a first channel, where the first information carries a first sequence of at least one second terminal, the first terminal supports a first transmission technology, the second terminal supports a second transmission technology, and the first sequence of the second terminal is used to indicate that the first channel is used by a terminal that supports the second transmission technology; determining, by the first terminal, first indication information based on the first sequence; and sending, by the first terminal, the first indication information on the first channel. According to the communication method provided in the embodiments of the present invention, terminals that support different transmission technologies can better coexist on a plurality of shared channels, and interference
(Continued)

between the different transmission technologies can be avoided.

18 Claims, 7 Drawing Sheets

(51) Int. Cl.
*H04W 72/04* (2009.01)
*H04W 88/02* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 8,737,327 | B2* | 5/2014 | Frederiksen | H04W 48/12 |
| | | | | 370/329 |
| 9,826,494 | B2* | 11/2017 | Chen | H04W 72/0406 |
| 10,129,840 | B2* | 11/2018 | Zhu | H04W 48/08 |
| 10,342,019 | B2* | 7/2019 | Xue | H04W 56/001 |
| 2016/0021526 | A1* | 1/2016 | Niu | H04W 28/0289 |
| | | | | 370/230 |
| 2016/0100419 | A1 | 4/2016 | Wang | |
| 2016/0345313 | A1 | 11/2016 | Zhao et al. | |
| 2017/0013596 | A1 | 1/2017 | van Phan et al. | |
| 2019/0007918 | A1* | 1/2019 | Feng | H04W 56/0015 |
| 2019/0174547 | A1* | 6/2019 | Khoryaev | H04B 17/318 |
| 2019/0254091 | A1* | 8/2019 | Kim | H04W 4/40 |
| 2019/0320429 | A1* | 10/2019 | Xue | H04W 8/005 |
| 2019/0335440 | A1* | 10/2019 | Tang | H04W 72/0406 |
| 2020/0120458 | A1* | 4/2020 | Aldana | H04W 28/22 |

FOREIGN PATENT DOCUMENTS

| | | |
|---|---|---|
| CN | 104125610 A | 10/2014 |
| CN | 104349470 A | 2/2015 |
| CN | 104796986 A | 7/2015 |
| CN | 105934984 A | 9/2016 |
| WO | 2013173621 A1 | 11/2013 |
| WO | 2015014244 A1 | 2/2015 |

OTHER PUBLICATIONS

Sony: "Network Control of V2V Services", 3GPP Draft; R1-155885, vol. RAN WG1, No. Malmo, Sweden; Oct. 5, 2015-Oct. 9, 2015, Oct. 4, 2015, XP051002673, 3 pages.

LG Electronics: "Considerations on the co-channel coexistence ofLTE PC V2V and IEEE 802.11 p", 3GPP Draft; R1-166839, vol. RAN WG 1, No. Gothenburg, Sweden; Aug. 22, 2016-Aug. 26, 2016, Aug. 21, 2016, XP051125583, 3 pages.

Qualcomm Incorporated, Co-channel coexistence for DSRC and Lte V2V, R1 166268, 3GPP TSG RAN WG1 #86, Aug. 22-26, 2016, Gothenburg, Sweden, total 6 pages.

LG Electronics, Considerations on the co channel coexistence of LTE PC5 V2V and IEEE 802. 11p, 3GPP TSG RAN WG1 Meeting #86, R1-166839, Gothenburg, Sweden Aug. 22-26, 2016. total 3 pages.

Huawei et al: "Coexistence of cellular and V2V services on the same carrier" 3GPP Draft; R1-166125,Aug. 22, 2016-Aug.26, 2016 Aug. 21, 2016 (Aug. 21, 2016), XP051140072,total 2 pages.

* cited by examiner

COMMUNICATION METHOD AND TERMINAL

CROSS-REFERENCE TO RELATED APPLICATIONS

This application is a continuation of International Application No. PCT/CN2016/100600, filed on Sep. 28, 2016, the disclosure of which is hereby incorporated by reference in its entirety.

TECHNICAL FIELD

The present invention relates to the field of communications technologies, and in particular, to a communication method and a terminal.

BACKGROUND

In recent years, people pay more attention to an automobile network. Road traffic safety and reliability, and traffic efficiency are improved through vehicle-to-vehicle communication or vehicle-to-roadside unit communication. An Intelligent Transportation System (ITS) includes Internet of Vehicles technologies such as vehicle-to-vehicle communication and vehicle-to-road communication. Transmission technologies used in the ITS include a dedicated short range communications (DSRC) transmission technology and a 4th Generation Long Term Evolution-Vehicle (LTE-V) transmission technology. The Vehicle-to-vehicle communication and the vehicle-to-road communication are usually implemented in a device-to-device (D2D) communication mode in LTE-V.

An ITS spectrum may be divided into a plurality of channels. For example, a 30-MHz spectrum assigned in Europe may be divided into three 10-MHz channels, and a 75-MHz spectrum assigned in the United States may be divided into seven 10-MHz channels (5 MHz spectrum is used for a guard band). Different transmission technologies may have different priorities on different channels. On a channel, when a terminal that uses a low-priority transmission technology detects a terminal that uses a high-priority transmission technology, the terminal that uses the low-priority transmission technology avoids interference to the terminal that uses the high-priority technology through avoidance or switching, and switches to another channel for data transmission.

However, not all LTE-V terminals can detect a DSRC terminal. An LTE-V terminal that can detect a DSRC terminal switches to another channel, and an LTE-V user that fails to detect a DSRC terminal still performs LTE-V transmission on an existing channel.

FIG. 1 is a schematic architectural diagram of an existing D2D communications system. As shown in FIG. 1, V1 represents a DSRC terminal, and V2 and V3 represent LTE-V terminals in FIG. 1. It is assumed that a transmission priority of a DSRC technology is higher than a transmission priority of an LTE-V technology on a channel 1. V1 and V2 can detect each other, and V1 and V3 cannot detect each other because of a relatively far distance. When V2 detects the DSRC terminal V1 on the channel 1, V2 gives way and switches to a channel 2 for data transmission. In this case, V3 fails to detect V1, and therefore V3 still performs transmission on the channel 1. If V2 and V3 have a receiving capability on only one channel, communication between V2 and V3 is interrupted.

In FIG. 1, if V2 and V3 each have a receiving capability on two channels, because V2 and V3 do not know whether there is an LTE-V terminal on both of the two channels, V2 and V3 need to detect all possible transmission resources on the two channels. Even if there is no DSRC terminal on the channel 1, and all LTE-V terminals perform transmission on the channel 1, V2 and V3 still need to detect the channel 2. Alternatively, if all LTE-V terminals detect a DSRC terminal on the channel 1, and switch to the channel 2 to perform transmission, both V2 and V3 still need to detect the channel 1 because V2 and V3 do not know whether there is a terminal that does not switch to the channel 2. In this case, energy consumption is very high, and this is particularly true for a handheld terminal device that features low energy consumption.

Therefore, in the prior art, there is a problem that LTE-V terminals perform LTE-V communication on different channels because some LTE-V terminals can detect a DSRC terminal, and some LTE-V terminals fail to detect a DSRC terminal. In addition, when detecting a DSRC terminal on a channel 1, an LTE-V terminal switches to a channel 2. However, when there is no DSRC terminal on the channel 1, there is a problem of how the LTE-V terminal on the channel 2 switches back to the channel 1 to increase a capacity of an LTE-V system.

SUMMARY

Embodiments of the present invention relate to a communication method and a terminal, to resolve a prior-art problem that an LTE-V terminal that fails to detect a DSRC terminal and an LTE-V terminal that detects a DSRC terminal perform communication on different channels, and a problem of how an LTE-V terminal switches back to an original channel when there is no DSRC terminal on the original channel.

According to a first aspect, an embodiment of the present invention provides a communication method, and the method includes:

receiving, by a first terminal, first information on a first channel, where the first information carries a first sequence of at least one second terminal, the first terminal supports a first transmission technology, the second terminal supports a second transmission technology, and the first sequence of the second terminal is used to indicate that the first channel is used by a terminal that supports the second transmission technology; determining, by the first terminal, first indication information based on the first sequence; and sending, by the first terminal, the first indication information on the first channel, where the first indication information is used to indicate that the first channel is used by the terminal that supports the second transmission technology.

Specifically, the first terminal that detects the second terminal sends the first indication information on the first channel, so that after detecting the first indication information, another terminal that supports the first transmission technology determines, based on the first indication information, that the first channel is used by the terminal that supports the second transmission technology, and the another terminal that supports the first transmission technology switches to a second channel for data transmission. Therefore, a problem that limited by a condition such as a distance, a terminal that uses a same transmission technology as the first terminal fails to detect that the first channel is used by the terminal that supports the second transmission technology, and cannot perform switching is resolved. Interference between the two transmission technologies is avoided on the first channel, and interruption of transmission between terminals that support the first transmission technology or high energy consumption that is caused because some of the terminals that support the first transmission technology fail in switching is avoided.

In an example, the first terminal may send the first indication information on the first channel in a broadcast manner. Another terminal may receive the first indication information on the first channel, and a terminal that uses a same transmission technology as the first terminal may identify the first indication information sent by the first terminal.

In a possible design, before the first terminal determines the first indication information based on the first sequence, the method further includes the following step: determining, by the first terminal, that a quantity of first sequences received within a preset period exceeds a preset threshold, where the quantity of first sequences is used to indicate a quantity of second terminals.

Specifically, when the quantity of second terminals exceeds the preset threshold, it reflects, to some extent, that a proportion occupied on the first channel by the terminals that support the second transmission technology exceeds a specific threshold. When detecting that the proportion occupied on the first channel by the second terminals exceeds the threshold, the first terminal sends the first indication information on the first channel. Therefore, channel resources can be more properly used.

In a possible design, the preset period is configured by a base station, or is preconfigured.

In a possible design, the preset threshold is configured by the base station, or is preconfigured.

In a possible design, the first terminal transmits data by using the second channel, and the first channel and the second channel are different from each other.

Specifically, the first terminal that detects, on the first channel, the terminal that supports the second transmission technology switches to the second channel for data transmission. Therefore, interference between the two transmission technologies is avoided on the first channel.

Further, a threshold may be set. When a quantity of first sequences received within a preset period exceeds the preset threshold, the first terminal sends the first indication information on the first channel, and the first terminal transmits data by using the second channel.

In a possible design, the first terminal sends the indication information by using a reserved resource on the first channel.

In a possible design, the first indication information is a sidelink synchronization sequence on the first channel; and the sending, by the first terminal, the first indication information on the first channel includes: sending, by the first terminal, the synchronization sequence on the first channel.

In a possible design, the first indication information is at least one bit in sidelink broadcast information on the first channel; and the sending, by the first terminal, the first indication information on the first channel includes: sending, by the first terminal, the at least one bit on the first channel.

In a possible design, a demodulation reference signal of a physical sidelink broadcast channel on the first channel includes the first indication information; and the sending, by the first terminal, the first indication information on the first channel includes: sending, by the first terminal, the demodulation reference signal on the first channel.

In a possible design, a demodulation reference signal in a time-frequency resource on the first channel includes the first indication information; and the sending, by the first terminal, the first indication information on the first channel includes: sending, by the first terminal, the demodulation reference signal on the first channel.

In a possible design, the first indication information is at least one data packet in a time-frequency resource on the first channel; and the sending, by the first terminal, the first indication information on the first channel includes: sending, by the first terminal, the at least one data packet on the first channel.

In a possible design, the first sequence includes one or more of the following sequences: a preamble sequence, a synchronization signal sequence, and a reference signal sequence.

It may be understood that a manner of configuring the reserved resource may be adjusted based on an actual requirement. The reserved resource is a channel for sending the first indication information. The terminals that support the first transmission technology may determine, by detecting the first indication information on the reserved resource on the first channel, whether the first channel is used by the terminal that supports the second transmission technology.

In a possible design, the first terminal periodically receives the first information on the first channel.

In a possible design, the reserved resource is a preconfigured resource or a resource configured by the base station.

It should be noted that, a plurality of terminals that support the first transmission technology or a plurality of terminals that support the second transmission technology perform device-to-device communication on the first channel or the second channel.

In a possible design, the first transmission technology and the second transmission technology have different transmission priorities on the first channel.

In a possible design, the first transmission technology is an Internet of Vehicles LTE-V transmission technology, and the second transmission technology is a dedicated short range communications DSRC technology.

In a possible design, a transmission priority of The LTE-V transmission technology is lower than that of the DSRC transmission technology on the first channel.

According to a second aspect, an embodiment of the present invention provides a communication method, and the method includes:

receiving, by a third terminal, first information on a first channel, where the first information carries first indication information, the third terminal supports a first transmission technology, and the first indication information is used to indicate that the first channel is used by a terminal that supports a second transmission technology; determining, by the third terminal, that the first channel is used by the terminal that supports the second transmission technology; and forwarding, by the third terminal, the first indication information on the first channel.

Specifically, the third terminal that detects the first indication information forwards the indication information on the first channel, so that after detecting the first indication information, another terminal with a further distance that supports the first transmission technology determines, based on the first indication information, that the first channel is used by the terminal that supports the second transmission technology, and switches to a second channel for data transmission. Therefore, a problem that limited by a condition such as a distance, a terminal that uses a same transmission technology as the third terminal fails to detect that the first channel is used by the terminal that supports the second transmission technology, and cannot perform switching is resolved. Interference between the two transmission technologies is avoided on the first channel, and interruption of transmission between terminals that support the first transmission technology or high energy consumption that is caused because some of the terminals that support the first transmission technology fail in switching is avoided.

In a possible design, the third terminal transmits data by using the second channel, and the first channel and the second channel are different from each other.

Specifically, the third terminal that detects the first indication information switches to the second channel for data transmission. Therefore, interference between the two transmission technologies is avoided on the first channel.

In a possible design, the third terminal forwards the indication information by using a reserved resource on the first channel. A resource used by the third terminal to receive the first indication information on the first channel is different from a resource used by the third terminal to forward the first indication information on the first channel.

In a possible design, the first indication information is a sidelink synchronization sequence on the first channel; and the forwarding, by the third terminal, the first indication information on the first channel includes: forwarding, by the first terminal, the synchronization sequence on the first channel.

In a possible design, the first indication information is at least one bit in sidelink broadcast information on the first channel; and the forwarding, by the first terminal, the first indication information on the first channel includes: forwarding, by the first terminal, the at least one bit on the first channel.

In a possible design, a demodulation reference signal of a physical sidelink broadcast channel on the first channel includes the first indication information; and the forwarding, by the first terminal, the first indication information on the first channel includes: forwarding, by the first terminal, the demodulation reference signal on the first channel.

In a possible design, a demodulation reference signal in a time-frequency resource on the first channel includes the first indication information; and the forwarding, by the first terminal, the first indication information on the first channel includes: forwarding, by the first terminal, the demodulation reference signal on the first channel.

In a possible design, the first indication information is at least one data packet in a time-frequency resource on the first channel; and the forwarding, by the first terminal, the first indication information on the first channel includes: forwarding, by the first terminal, the at least one data packet on the first channel.

In a possible design, the third terminal periodically receives the first information on the first channel.

In a possible design, the reserved resource is a preconfigured resource or a resource configured by a base station.

In a possible design, the first transmission technology and the second transmission technology have different transmission priorities on the first channel.

In a possible design, the first transmission technology is an Internet of Vehicles LTE-V transmission technology, and the second transmission technology is a dedicated short range communications DSRC technology.

In a possible design, a transmission priority of The LTE-V transmission technology is lower than that of the DSRC transmission technology on the first channel.

According to a third aspect, an embodiment of the present invention provides a communication method, and the method includes:

receiving, by a fourth terminal, first information on a first channel, where the first information does not carry a first sequence of a second terminal, and the first information does not carry first indication information, the fourth terminal supports a first transmission technology, the second terminal supports a second transmission technology, the first sequence of the second terminal is used to indicate that the first channel is used by a terminal that supports the second transmission technology, and the first indication information is used to indicate that the first channel is used by the terminal that supports the second transmission technology; determining, by the fourth terminal, that the first channel is not used by the terminal that supports the second transmission technology; and transmitting, by the fourth terminal, data by using the first channel.

Specifically, when a terminal that supports the first transmission technology does not detect the first sequence of the second terminal or the first indication information on the first channel, the terminal determines that the first channel is not used by the terminal that supports the second transmission technology, and continues to transmit data by using the first channel. Alternatively, when a terminal that supports the first transmission technology and that switches to a second channel does not detect the first sequence of the second terminal or the first indication information on the first channel, the terminal switches back to the first channel for data transmission. In this embodiment of the present invention, switching between channels by terminals that support different transmission technologies is improved, thereby effectively increasing a capacity of a communications system, and improving channel utilization.

In a possible design, the fourth terminal periodically receives the first information on the first channel.

In a possible design, the first transmission technology and the second transmission technology have different transmission priorities on the first channel.

In a possible design, the first transmission technology is an Internet of Vehicles LTE-V transmission technology, and the second transmission technology is a dedicated short range communications DSRC technology.

In a possible design, a transmission priority of The LTE-V transmission technology is lower than that of the DSRC transmission technology on the first channel.

According to a fourth aspect, an embodiment of the present invention provides a terminal. The terminal includes a receiving unit, a determining unit, and a sending unit.

The receiving unit is configured to receive first information on a first channel. The first information carries a first sequence of at least one second terminal, the terminal supports a first transmission technology, the second terminal supports a second transmission technology, and the first sequence of the second terminal is used to indicate that the first channel is used by a terminal that supports the second transmission technology. The determining unit is configured to determine first indication information based on the first sequence. The sending unit is configured to send the first indication information on the first channel. The first indication information is used to indicate that the first channel is used by the terminal that supports the second transmission technology.

In a possible design, the determining unit is further configured to determine that a quantity of first sequences received by the receiving unit within a preset period exceeds a preset threshold. The quantity of first sequences is used to indicate a quantity of second terminals.

In a possible design, the preset period is configured by a base station, or is preconfigured.

In a possible design, the preset threshold is configured by the base station, or is preconfigured.

In a possible design, the receiving unit is further configured to receive information on a second channel, and the sending unit is further configured to send information on the second channel. The first channel and the second channel are different from each other.

In a possible design, the first indication information is a sidelink synchronization sequence on the first channel, and the sending unit is specifically configured to send the synchronization sequence on the first channel.

In a possible design, the first indication information is at least one bit in sidelink broadcast information on the first channel, and the sending unit is specifically configured to send the at least one bit on the first channel.

In a possible design, a demodulation reference signal of a physical sidelink broadcast channel on the first channel includes the first indication information, and the sending unit is specifically configured to send the demodulation reference signal on the first channel.

In a possible design, a demodulation reference signal in a time-frequency resource on the first channel includes the first indication information, and the sending unit is specifically configured to send the demodulation reference signal on the first channel.

In a possible design, the first indication information is at least one data packet in a time-frequency resource on the first channel, and the sending unit is specifically configured to send the at least one data packet on the first channel.

In a possible design, the first sequence includes one or more of the following sequences: a preamble sequence, a synchronization signal sequence, and a reference signal sequence.

In a possible design, the receiving unit is specifically configured to periodically receive the first information on the first channel.

According to a fifth aspect, an embodiment of the present invention provides a terminal. The terminal includes a receiving unit, a determining unit, and a sending unit.

The receiving unit is configured to receive first information on a first channel. The first information carries first indication information, the terminal supports a first transmission technology, and the first indication information is used to indicate that the first channel is used by a terminal that supports the second transmission technology. The determining unit is configured to determine that the first channel is used by the terminal that supports the second transmission technology. The sending unit is configured to forward the first indication information on the first channel.

In a possible design, the receiving unit is further configured to receive information on a second channel, and the sending unit is further configured to send information on the second channel. The first channel and the second channel are different from each other.

In a possible design, a resource used by the terminal to receive the indication information on the first channel is different from a resource used by the terminal to forward the indication information on the first channel.

In a possible design, the first indication information is a sidelink synchronization sequence on the first channel, and the sending unit is specifically configured to forward the synchronization sequence on the first channel.

In a possible design, the first indication information is at least one bit in sidelink broadcast information on the first channel, and the sending unit is specifically configured to forward the at least one bit on the first channel.

In a possible design, a demodulation reference signal of a physical sidelink broadcast channel on the first channel includes the first indication information, and the sending unit is specifically configured to forward the demodulation reference signal on the first channel.

In a possible design, a demodulation reference signal in a time-frequency resource on the first channel includes the first indication information, and the sending unit is specifically configured to forward the demodulation reference signal on the first channel.

In a possible design, the first indication information is at least one data packet in a time-frequency resource on the first channel, and the sending unit is specifically configured to forward the at least one data packet on the first channel.

In a possible design, the receiving unit is specifically configured to periodically receive the first information on the first channel.

According to a sixth aspect, an embodiment of the present invention provides a terminal. The terminal includes a receiving unit, a determining unit, and a sending unit.

The receiving unit is configured to receive first information on a first channel. The first information does not carry a first sequence of a second terminal, and the first information does not carry first indication information, the terminal supports a first transmission technology, the second terminal supports a second transmission technology, the first sequence of the second terminal is used to indicate that the first channel is used by a terminal that supports the second transmission technology, and the first indication information is used to indicate that the first channel is used by the terminal that supports the second transmission technology. The determining unit is configured to determine that the first channel is not used by the terminal that supports the second transmission technology. The sending unit is configured to transmit data by using the first channel.

Specifically, when a terminal that supports the first transmission technology does not detect the first sequence of the second terminal or the first indication information on the first channel, the terminal determines that the first channel is not used by the terminal that supports the second transmission technology, and continues to transmit data by using the first channel. Alternatively, when a terminal that supports the first transmission technology and that switches to a second channel does not detect the first sequence of the second terminal or the first indication information on the first channel, the terminal switches back to the first channel for data transmission. In this embodiment of the present invention, switching between channels by terminals that support different transmission technologies is improved, thereby effectively increasing a capacity of a communications system, and improving channel utilization.

In a possible design, the receiving unit periodically receives the first information on the first channel.

In a possible design, the first transmission technology and the second transmission technology have different transmission priorities on the first channel.

In a possible design, the first transmission technology is an Internet of Vehicles LTE-V transmission technology, and the second transmission technology is a dedicated short range communications DSRC technology.

In a possible design, a transmission priority of The LTE-V transmission technology is lower than that of the DSRC transmission technology on the first channel.

According to a seventh aspect, an embodiment of the present invention provides a communication method, and the method includes:

receiving, by a base station, information that is reported by a first terminal and indicates that a first channel is used by a terminal that supports a second transmission technology, where the first terminal supports a first transmission technology; determining, by the base station, that the first channel is used by the terminal that supports the second transmission technology; and configuring, by the base station, a terminal that supports the first transmission technology to transmit data by using a second channel, where the first channel and the second channel are different from each other.

Specifically, in this embodiment of the present invention, switching between channels by terminals that support different transmission technologies is implemented through configuration by the base station, and interference between the different transmission technologies on a same channel is avoided.

In a possible design, when the base station does not receive, within a preset period, the information that is reported by the first terminal and indicates that the first channel is used by the terminal that supports the second transmission technology, the base station configures the terminal that supports the first transmission technology to transmit data by using the first channel.

Specifically, the base station uses a mechanism of a preset period configuration function, to resolve a problem of how the first terminal switches back to an original channel in a timely manner when there is no terminal that supports the second transmission technology on the original channel. Switching between channels by terminals that support different transmission technologies is improved, thereby effectively increasing a capacity of a communications system, and improving channel utilization.

In a possible design, the base station configures, by using one or more of radio resource control RRC, downlink control information DCI, and a system information block SIB, the first-type terminal to transmit data by using the second channel.

Based on the technical solutions, the embodiments of the present invention provide the communication method and the terminal, to avoid interference between different transmission technologies. For example, in the embodiments of the present invention, the DSRC transmission technology and the LTE-V transmission technology can better coexist. In addition, energy consumption in D2D communication can be reduced, a capacity of a communications system can be increased, and channel utilization can be improved.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

A network architecture and a service scenario that are described in the embodiments of the present invention are intended to describe the technical solutions in the embodiments of the present invention more clearly, and constitute no limitation on the technical solutions provided in the embodiments of the present invention. A person of ordinary skill in the art may learn that with evolution of the network architecture and emergence of a new service scenario, the technical solutions provided in the embodiments of the present invention are also applicable to a similar technical problem.

In the embodiments of the present invention, terms "network" and "system" are usually interchangeably used, but meanings of the terms may be understood by a person skilled in the art. A base station (BS) in the embodiments of the present invention is an apparatus that is deployed in a radio access network and that is configured to provide a wireless communication function for a terminal, has a radio resource management function, and communicates with a terminal, or serves as a central controller that assists in direct communication between terminals.

Figure 1:
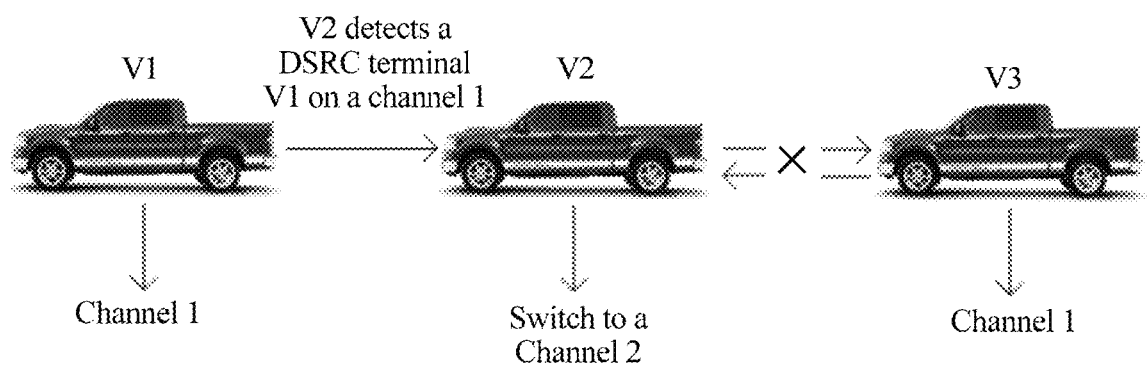
FIG. 1 is a schematic architectural diagram of an existing D2D communications system.
Figure 2:
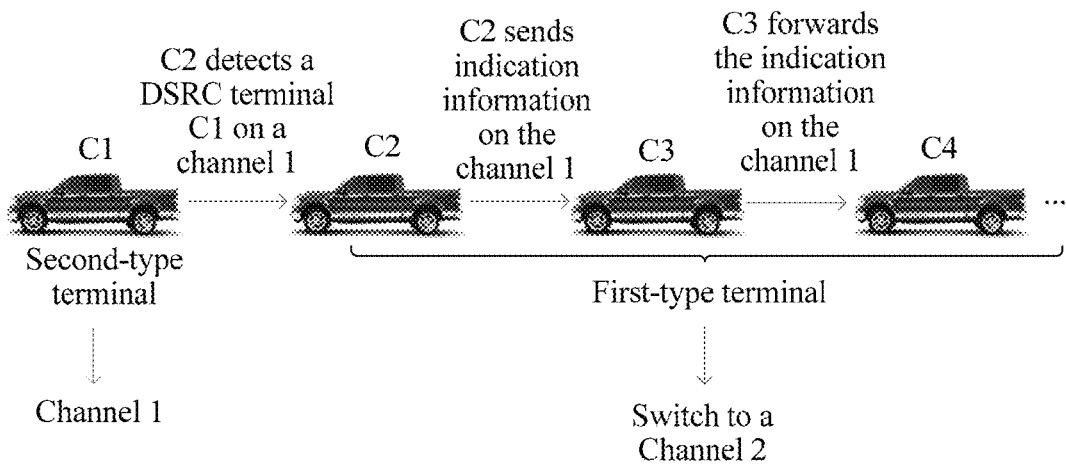
FIG. 2 is a schematic architectural diagram of a communications system according to an embodiment of the present invention.

FIG. 2 is a schematic architectural diagram of a communications system according to an embodiment of the present invention. A technology described in the embodiments of the present invention may be applied to a Long Term Evolution (LTE) system or other wireless communications systems that use various radio access technologies, for example, systems that use access technologies such as Code Division Multiple Access, Frequency Division Multiple Access, Time Division Multiple Access, orthogonal frequency division multiple access, and single carrier frequency division multiple access. In addition, the technology may be further applied to a subsequent evolved system of the LTE system, for example, a 5th generation system. For clarity, the LTE system is merely used as an example herein for description. More specifically, a communication method provided in the embodiments of the present invention is applied to an Internet of Vehicles system, or a D2D system, and a base station is optional.

A terminal in the embodiments of the present invention may include various in-vehicle devices with a wireless communication function, or other processing devices connected to a wireless modem, and includes but is not limited to a vehicle, a handheld device, a device that can communicate with a base station device, or a device that can directly communicate with another terminal. For ease of description, the devices mentioned above are collectively referred to as a terminal in the embodiments of the present invention.

As shown in FIG. 2, a plurality of terminals may directly communicate with each other. The terminals may transmit data to each other by using two transmission technologies: an LTE-V transmission technology or a DSRC transmission technology. The terminals may be classified into a first-type terminal and a second-type terminal based on supported transmission technologies.

An embodiment of the present invention provides a communication method and a terminal. A first-type terminal and a second-type terminal transmit data by using a plurality of shared channels. In an example for description, the plurality of channels include a first channel and a second channel. The first-type terminal supports a first transmission technology, and the second-type terminal supports a second transmission technology. The first-type terminal receives first information on the first channel. When the first information carries first indication information or at least one first sequence of the second-type terminal, the first-type terminal determines that the first channel is used by a terminal that supports the second transmission technology, and the first-type terminal transmits data by using the second channel. The first sequence of the second-type terminal or the first indication information is used to indicate that the first channel is used by the terminal that supports the second transmission technology. Transmission technologies supported by the first-type terminal and the second-type terminal on different channels may have different transmission priorities.

When a first-type terminal detects the at least one first sequence of the second-type terminal on the first channel, the first-type terminal sends the first indication information on the first channel, and the first-type terminal transmits data by using another channel. When another first-type terminal detects the first indication information on the first channel, the another first-type terminal forwards the first indication information on the first channel, and the another first-type terminal transmits data by using another channel.

It should be noted that, in this embodiment of the present invention, on the first channel, terminals that use different transmission technologies are assigned to different channels, to avoid interference between the different transmission technologies. Transmission priorities of the first transmission technology used by the first-type terminal and the second transmission technology used by the second-type terminal are not be specifically limited in this embodiment of the present invention. For example, when the first transmission technology and the second transmission technology have different transmission priorities on the first channel, a terminal of one type transmits data by using the second channel upon detecting, on the first channel, at least one first sequence of a terminal of the other type or indication information indicating existence of the terminal of the other type. In addition, the indication information indicating existence of the terminal of the other type may be sent by any terminal of the one type that detects the at least one sequence of the terminal of the other type. Any terminal of the one type that receives the indication information forwards the indication information, so that another first-type terminal with a further distance receives the indication information, and performs channel switching based on the indication information. The sequence of the terminal is used to indicate that a terminal that supports a same transmission technology as the terminal uses the first channel.

It should be noted that, the communication method provided in this embodiment of the present invention relates to D2D communication. A biggest difference from a conventional cellular communications technology lies in that in D2D communication, communication may be directly performed without forwarding by a base station. The base station may perform resource configuration, scheduling, coordination, and the like to assist in direct communication between terminals. In a D2D technology, data is transmitted in a broadcast manner, and two features are included: discovery and communication. The discovery means that a terminal periodically broadcasts information, so that a terminal surrounding the terminal can detect the information and discover the terminal. The communication is direct data transmission between two terminals.

It may be understood that, ITS-D2D communication is limited by a distance. Therefore, based on a transmission feature in D2D communication, a first-type terminal that detects the at least one first sequence of the second-type terminal on the first channel sends the indication information on the first channel. Another first-type terminal may receive and identify, on the first channel, the indication information sent by the first terminal. In addition, after identifying the indication information, the second terminal forwards the indication information, so that another first-type terminal that fails to detect the second-type terminal determines, based on the indication information, that the first channel is used by the second-type terminal, and first-type terminals switch to the second channel for data transmission based on the at least one first sequence of the second-type terminal or the indication information detected on the first channel.

Specifically, transmission priorities of the first transmission technology and the second transmission technology on the first channel or the second channel are not specifically limited in the present invention, and may be adjusted based on an actual requirement. This embodiment of the present invention is intended to enable terminals that support different transmission technologies to transmit data by using different channels, to avoid interference between the different transmission technologies, and to avoid interruption of transmission between first-type terminals or high energy consumption that is caused because some first-type terminals fail in switching.

It may be understood that, according to the communication method provided in this embodiment of the present invention, a following case can be avoided in D2D communication: Limited by a distance or another condition, the first-type terminal cannot detect the second-type terminal on the first channel. According to the communication method provided in this embodiment of the present invention, terminals that support different transmission technologies can better coexist on a plurality of shared channels, and interference between the different transmission technologies can be better avoided.

In this embodiment of the present invention, the first-type terminal may be an LTE-V terminal that uses an LTE-V transmission technology, and the second-type terminal may be a DSRC terminal that uses a DSRC transmission technology. The LTE-V terminal and the DSRC terminal have different transmission priorities on the first channel. For example, a transmission priority of the LTE-V terminal is lower than that of the DSRC terminal on the first channel. When the LTE-V terminal detects a DSRC channel on the first channel, the LTE-V terminal switches to the second channel for data transmission. In addition, the LTE-V terminal sends indication information on the first channel, to indicate that the DSRC terminal is detected on the first channel. After another LTE-V terminal receives the indication information on the first channel, the another LTE-V terminal forwards the indication information on the first channel, and switches to the second channel for data transmission.

As shown in FIG. 2, C1 represents the second-type terminal (a DSRC terminal), and C2, C3, and C4 represent the first-type terminal (an LTE-V terminal). When receiving information on a channel 1 and detecting that the information on the channel 1 carries at least one first sequence of C1, C2 closest to C1 determines that there is a DSRC terminal on the channel 1, in other words, there is the DSRC transmission technology on the channel 1. When a quantity of first sequences received by C2 within a preset period exceeds a preset threshold, C2 sends indication information on a reserved resource on the channel 1, where the indication information indicates that there is a DSRC terminal on the channel 1, and C2 switches to a channel 2 for data transmission. The preset threshold may be 1. C3 close to C2 receives information on the channel 1, and identifies the indication information sent by C2. When determining that there is a DSRC terminal on the channel 1, C3 forwards the indication information on a reserved resource of the channel 1, and C3 switches to the channel 2 for data transmission. Similarly, C4 that receives the indication information forwarded by C3 also forwards the indication information, and C4 switches to the channel 2 for data transmission.

According to the communication method and the terminal provided in this embodiment of the present invention, after detecting a DSRC terminal on the first channel, an LTE-V terminal sends, on the first channel to another LTE-V terminal, indication information indicating that the first channel is used by a DSRC terminal to transmit data, and the another LTE-V terminal forwards the indication information after receiving the indication information on the first channel, so that an LTE-V terminal that detects a DSRC terminal or the indication information on the first channel switches to the second channel for data transmission, and an LTE-V terminal that fails to detect a DSRC terminal because of a distance limitation of the terminal can perform channel switching based on the indication information. Therefore, the DSRC terminal and the LTE-V terminal better coexist, thereby implementing highly efficient data transmission with low energy consumption.

Figure 3:
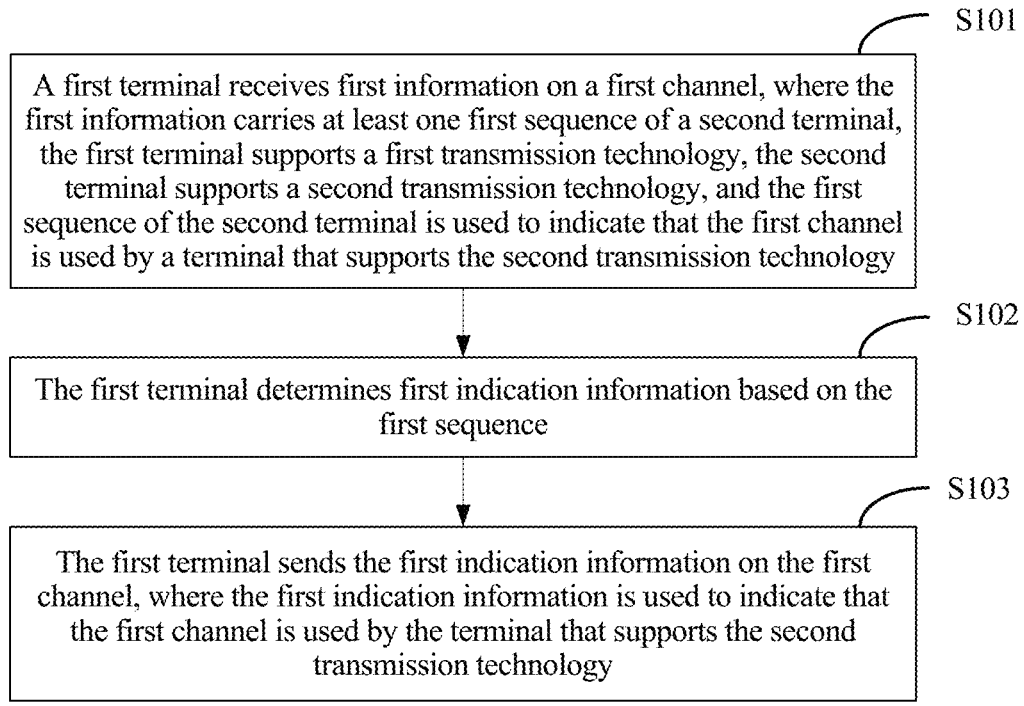
FIG. 3 is a schematic flowchart of a communication method according to an embodiment of the present invention.

In one example, first-type terminals include a first terminal, a third terminal, and a fourth terminal, and a second-type terminal includes a second terminal. In one embodiment of the present invention, the first terminal receives, on a first channel, first information that carries at least one first sequence of the second terminal, sends first indication information on the first channel, and switches to a second channel for data transmission. A solution provided in this embodiment of the present invention is described in detail below with reference to FIG. 3. FIG. 3 is a flowchart of a communication method according to an embodiment of the present invention. In this embodiment of the present invention, the method is performed by a first terminal. As shown in FIG. 3, this embodiment specifically includes the following steps.

Step S101: The first terminal receives first information on a first channel, where the first information carries a first sequence of at least one second terminal, the first terminal supports a first transmission technology, the second terminal supports a second transmission technology, and the first sequence of the second terminal is used to indicate that the first channel is used by a terminal that supports the second transmission technology.

In an LTE-V system, a vehicle usually communicates with another node in two manners. In a first manner, the vehicle sends status information of the vehicle to another surrounding vehicle in a broadcast manner without data forwarding by a base station. This communication manner is similar to that in an LTE-D2D system. In a second manner, information about the vehicle is forwarded by a base station. The vehicle first sends status information to the base station, and then the base station sends data to another vehicle or node in a unicast or broadcast manner.

Figure 13:
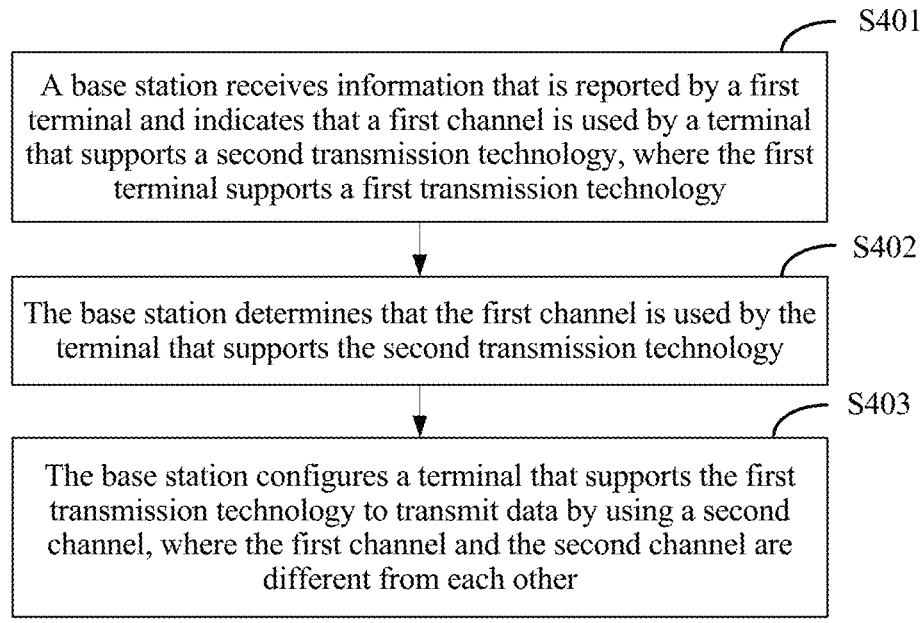
FIG. 13 is a schematic flowchart of yet another communication method according to an embodiment of the present invention.

It should be noted that, for the manner in which the information about the vehicle is forwarded by the base station, refer to descriptions in an embodiment shown in FIG. 13 in the present invention. The following first describes the manner in which vehicles perform D2D or V2V communication in a broadcast manner in this embodiment of the present invention.

A communication manner in the LTE-D2D system is described in detail below to describe the communication method provided in this embodiment of the present invention.

In a D2D technology, a mechanism of scheduling assignment (SA)+data (Data) is used in communication.

The SA represents scheduling assignment information, and is used to indicate status information of data sent from a transmit end, including time resource pattern (T-RPT) information, modulation and coding scheme (MCS) information, a frequency hopping indication, timing advance information, receiver group ID information, and the like of the data. The T-RPT indicates a time resource occupied by a data part corresponding to the T-RPT information, namely, a subframe in which the data part is transmitted, and further a receive end can receive service data based on an indication in the SA. The data is service data sent by the transmit end in a format indicated in the SA and at a time-frequency resource location indicated in the SA. If a D2D terminal is located in a coverage area of a cell, a base station assigns a transmission resource pool to the D2D terminal for data transmission.

Specifically, the resource pool is a set of transmission resources, and is time-frequency resource information configured by the base station for D2D transmission. The base station may configure different resource pools such as a discovery resource pool, an SA resource pool, and a data resource pool. The SA resource pool and the data resource pool in the D2D system are time division, the SA resource pool precedes the data resource pool, and a transmission resource used by the data is indicated in the SA. The D2D communication manner is also used in vehicle-to-vehicle (V2V) communication in an Internet of Vehicles. In a V2V system, an SA resource pool and a data resource pool may be frequency division, in other words, the SA and the data occupy different frequency domain resources in a same subframe. The terminal transmits or listens to a signal in a corresponding resource pool based on resource pool information broadcast by the base station, to implement D2D transmission.

Figure 4A:
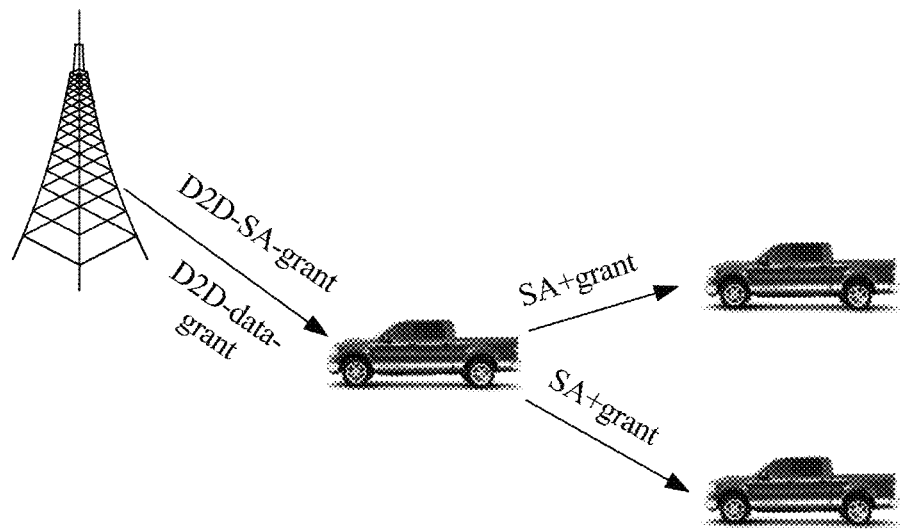
FIG. 4a is a schematic diagram of sending, by a terminal, status information of the terminal to another surrounding vehicle in a broadcast manner in a mode 1.
Figure 4B:
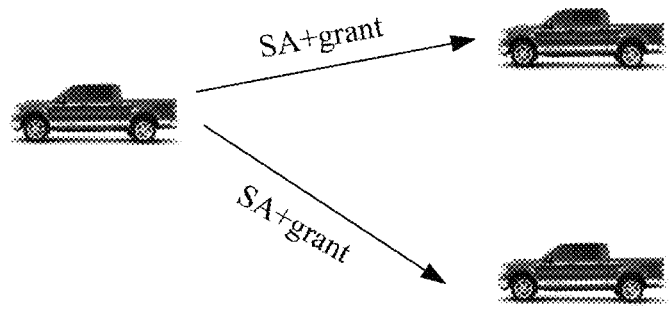
FIG. 4b is a schematic diagram of sending, by a terminal, status information of the terminal to another surrounding vehicle in a broadcast manner in a mode 2.

FIG. 4 is a schematic diagram of sending, by a terminal, status information of the terminal to another surrounding vehicle in a broadcast manner according to an embodiment of the present invention. There are two working modes: a mode 1 (as shown in FIG. 4a) and a mode 2 (as shown in FIG. 4b) for communication. The terminal (for example, a vehicle) may send data in the D2D broadcast manner in the mode 1 or the mode 2. In mode 1, the base station assigns a determined time-frequency resource to each D2D terminal for D2D transmission. As shown in FIG. 4a, "D2D-SA-grant" indicates that the base station assigns a determined SA resource to the terminal, and "D2D-data-grant" indicates that the base station assigns a determined data resource to the terminal. In the mode 2, the terminal independently selects an SA resource from an SA resource pool in a random or listening manner and selects a data resource from a data resource pool in a random or listening manner to perform D2D transmission. "SA+data" indicates that D2D data transmission is performed by using SA and data resources.

In addition, a receiving terminal blindly detects SA in the SA resource pool, and then detects data on a corresponding resource in the data resource pool by using data time-frequency resource information indicated in the SA. A maximum quantity of times that the terminal blindly detects SA in each subframe is limited in the D2D system.

It should be noted that, the first terminal may send the indication information on the first channel in the mode 1 of requesting the base station to assign a determined time-frequency resource in a resource pool. In addition, the first terminal may alternatively send the indication information in the mode 2 of independently selecting an SA resource from an SA resource pool in a random or listening manner and selecting a data resource from a data resource pool in a random or listening manner. Similarly, another terminal that supports the first transmission technology can also send related information on the first channel in the mode 1 or mode 2. Details are not described below.

It should be noted that, the first terminal blindly detects SA in an SA resource pool on the first channel, and then detects data on the first channel on a corresponding resource in the data resource pool based on data time-frequency resource information indicated in the SA. Similarly, another terminal that supports the first transmission technology can also receive information on the first channel in this manner. Details are not described below.

The first terminal periodically receives the first information on the first channel. For example, the first terminal may receive the first information on the first channel at a specific time interval.

It may be understood that, the two working modes shown in FIG. 4 are both applicable to the communication method provided in this embodiment of the present invention. Details are not described below.

Step S102: The first terminal determines first indication information based on the first sequence.

Specifically, the first sequence of the second-type terminal includes one or more of the following sequences: a preamble sequence, a synchronization signal sequence, and a reference signal sequence, or any other signal that can identify the second-type terminal. There is a correspondence between a preamble or a signal of a terminal and a transmission technology used by the terminal.

In an example, the second terminal may be a DSRC terminal or an LTE-V terminal. When the second terminal is a DSRC terminal, the first sequence is a preamble sequence. When the second terminal is an LTE-V terminal, the first sequence is a synchronization signal sequence or a reference signal sequence.

The first terminal determines, based on the first sequence, that the first channel is used by the terminal that supports the second transmission technology. The first terminal determines the first indication information. The first indication information is used to indicate that the first channel is used by the terminal that supports the second transmission technology. In an example, the first terminal may send information on the first channel in a broadcast manner. Another terminal may receive information on the first channel, and another terminal that supports a same transmission technology as the first terminal may identify the information from the first terminal.

Preferably, before the first terminal determines the first indication information based on the first sequence, the method described in this embodiment further includes the following step: determining, by the first terminal, that a quantity of first sequences received within a preset period exceeds a preset threshold. The quantity of first sequences is used to indicate a quantity of second terminals. The preset period is configured by the base station, or is preconfigured. The preset threshold is configured by the base station, or is preconfigured.

It should be noted that, a quantity of the second terminals reflects a proportion occupied on the first channel by the terminals that support the second transmission technology. When detecting that the proportion occupied on the first channel by the second terminals exceeds a threshold, the first terminal sends the first indication information on the first channel. Therefore, resources on the first channel can be properly used. For example, a DSRC terminal may send a data packet that carries a preamble sequence at an interval of 100 ms. Because there is no great difference between preamble sequences of terminals that support a DSRC transmission technology, it may be considered that the preamble sequences of the DSRC terminals are the same. An LTE-V terminal may determine a quantity of DSRC terminals based on a quantity of preamble sequences detected within 100 ms. Further, the quantity of DSRC terminals reflects a proportion of the resources occupied by the DSRC terminals on the first channel. When the quantity of DSRC terminals exceeds a preset threshold, the first terminal sends the first indication information on the first channel.

In an example, when detecting 20 DSRC terminals within 100 ms, the LTE-V terminal sends the first indication information on the first channel.

In addition, different DSRC terminals may have different preamble sending periods. The quantity of preambles may not be strictly corresponding to the quantity of DSRC terminals. In the technical solution provided in this embodiment of the present invention, a quantity of preambles received within a preset period may reflect an appearance probability of DSRC terminals within the time period.

It should be noted that, it is preset that after detecting, on the first channel, that the quantity of DSRC terminals exceeds a specific quantity, the LTE-V terminal sends, on the first channel, information indicating that the first channel is used by the DSRC terminals, and switches to the second channel for data transmission. Although the LTE-V terminal detects that the quantity of DSRC terminals does not exceed the specific quantity, there is some interference between the DSRC transmission technology and an LTE-V transmission technology. However, a problem that after the LTE-V terminal performs switching, excessive resources on the first channel are left unused because of an excessively small quantity of DSRC terminals can be avoided in the solution. In this embodiment of the present invention, an appropriate quantity threshold may be set to balance transmission technology interference and channel resource utilization.

Further, the first terminal transmits data by using the second channel. The first terminal sends data by using the second channel. The data sent by the first terminal on the second channel is used to communicate with another first-type terminal.

It may be understood that, a mechanism used by the first terminal to transmit data by using the second channel is the same as a mechanism used by the first terminal to send the first indication information on the first channel. Specifically, when the first information carries the at least one first sequence of the second terminal, or the first information carries the at least one first sequence of the second terminal, and the quantity of first sequences received within the preset period exceeds the preset threshold, the first terminal sends the first indication information on the first channel, and the first terminal transmits data by using the second channel. Therefore, when one of terminals that support a same transmission technology as the first terminal detects a terminal that supports the second transmission technology, or detects that a quantity of terminals that support the second transmission technology meets a preset condition, all the terminals that support a same transmission technology as the first terminal perform channel switching.

Step S103: The first terminal sends the first indication information on the first channel, where the first indication information is used to indicate that the first channel is used by the terminal that supports the second transmission technology.

Specifically, the first terminal sends the indication information by using a reserved resource on the first channel. The communication method provided in this embodiment of the present invention is described below in a plurality of reserved resource configuration manners.

It should be noted that, the first terminal may be an LTE-V terminal, and the second terminal may be a DSRC terminal. In the following, a channel 1, a channel 2, a DSRC terminal, an LTE-V terminal A, and an LTE-V terminal B are used as an example for description. A transmission priority of the DSRC terminal is higher than that of the LTE-V terminal on the channel 1.

A resource is reserved on the channel 1, and the resource may be a specific resource or a resource in a resource pool.

When detecting a DSRC terminal on the channel 1, the LTE-V terminal A switches to the channel 2 for LTE-V transmission, and the LTE-V terminal A sends indication information on the resource reserved on the channel 1, to indicate that a DSRC terminal is detected on the channel 1.

The LTE-V terminal A periodically detects whether there is a DSRC terminal on the channel 1, and when detecting a DSRC terminal, the LTE-V terminal A sends the indication information on the resource reserved on the channel 1. It may be understood that, the indication information is periodically sent, and when no DSRC terminal is detected on the channel 1, sending of the indication information is stopped.

Specifically, the first indication information is a sidelink synchronization sequence on the first channel, and that the first terminal sends the first indication information on the first channel includes: sending, by the first terminal, the synchronization sequence on the first channel.

Specifically, the first indication information is at least one bit in sidelink broadcast information on the first channel, and that the first terminal sends the first indication information on the first channel includes: sending, by the first terminal, the at least one bit on the first channel.

Specifically, a demodulation reference signal of a physical sidelink broadcast channel on the first channel includes the first indication information, and that the first terminal sends the first indication information on the first channel includes: sending, by the first terminal, the demodulation reference signal on the first channel.

For example, the first terminal sends the indication information by using a specific synchronization sequence in a sidelink synchronization signal (SLSS) resource on the first channel.

For another example, the first terminal sends the indication information by using a specific bit in the sidelink broadcast information sent on the first channel, or sends the indication information by using the demodulation reference signal (DMRS) of the physical sidelink broadcast channel (PSBCH) on the first channel.

Specifically, a demodulation reference signal in a time-frequency resource on the first channel includes the first indication information, and that the first terminal sends the first indication information on the first channel includes: sending, by the first terminal, the demodulation reference signal on the first channel.

Specifically, the first indication information is at least one data packet in a time-frequency resource on the first channel, and that the first terminal sends the first indication information on the first channel includes: sending, by the first terminal, the at least one data packet on the first channel. For another example, the first terminal sends the indication information by using a DMRS signal or a data packet in a resource including a specific time-frequency location set on the first channel. The resource including a time-frequency location set may be a specific time-frequency location. For example, a time resource is a subframe X ms later than an SLSS subframe, and a frequency domain resource is Y physical resource blocks (PRB) whose start location is separated from a start location of system bandwidth by Z PRBs. The indication information may be carried by the DMRS such as a specific DMRS sequence, cyclic shift (CS), or scrambling code, or the indication information is carried by the data packet, to transmit the indication information on the resource.

It should be noted that, the DMRS signal herein may be replaced with another available reference signal (RS) or a pilot signal. A pilot signal includes a base sequence, cyclic shift, orthogonal cover code (OCC), and the like. The first indication information may be indicated in different manners. For example, whether the indication information is carried is indicated by using different cyclic shift of the pilot signal. It may be understood by a person skilled in the art that, manners of carrying the indication information by the another RS signal or pilot signal shall fall within the protection scope of the embodiments of the present invention.

It may be understood that, one or more of the manners of sending the indication information on the reserved resource may be combined. In other words, a distinctive signal is sent on an SLSS resource, and the first indication information is carried by a pilot or a data packet; or a distinctive signal is sent on a PSBCH resource, and the first indication information is carried by a pilot or a data packet.

In addition, the LTE-V terminal B detects whether there is indication information on the reserved resource on the channel 1. If the indication information is detected, the LTE-V terminal B switches to the channel 2, and also sends indication information on a reserved resource. If no indication information is detected, the LTE-V terminal B still performs LTE-V transmission on the channel 1.

It should be noted that, the LTE-V terminal B also sends the indication information on the reserved resource. A resource used by the LTE-V terminal B to send the indication information is different from a resource used by LTE-V terminal A to send the indication information. In addition, that the LTE-V terminal B sends the indication information may be understood as that the LTE-V terminal B forwards the indication information from the LTE-V terminal A.

Further, after switching to the channel 2, the LTE-V terminal A or the LTE-V terminal B receives information on the channel 1 at a specific time interval, and continues to detect whether there is a DSRC terminal or indication information on the channel 1. When detecting that there is a DSRC terminal or indication information on the channel 1, the LTE-V terminal A or the LTE-V terminal B sends the indication information on the channel 1, and continues to transmit data by using the channel 2. The resource is reserved on the channel 1 to indicate that there is a DSRC terminal on the channel, so that an LTE-V terminal that fails to detect a DSRC terminal can also determine, by detecting the indication information, that there is a DSRC terminal on the channel.

According to the communication method provided in this embodiment of the present invention, the LTE-V transmission technology and the DSRC transmission technology have different transmission priorities on the channel 1. When detecting a DSRC terminal on the channel 1, the LTE-V terminal switches to the channel 2 for LTE-V transmission, and sends the indication information on the channel 1 to indicate that there is a DSRC terminal. Another LTE-V terminal that fails to detect a DSRC terminal may learn, by detecting the indication information, that there is a DSRC terminal on the channel 1, and switch to the channel 2.

Figure 5:
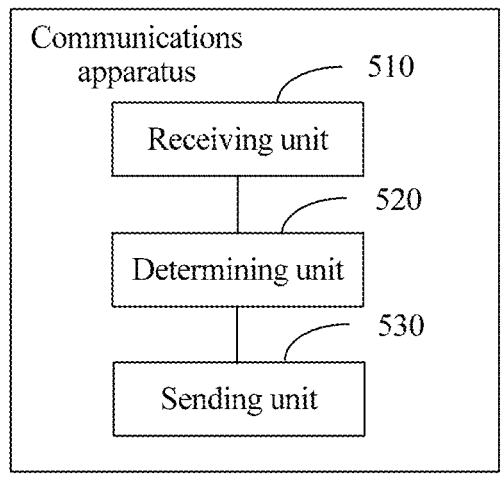
FIG. 5 is a schematic architectural diagram of a terminal according to an embodiment of the present invention.

According to the method described in the foregoing embodiment, the DSRC transmission technology and the LTE-V transmission technology can better coexist, D2D transmission efficiency can be improved, and mutual interference between two transmission technologies on a same channel can be avoided. Correspondingly, an embodiment of the present invention provides a terminal to implement the communication method provided in the foregoing embodiment. As shown in FIG. 5, the terminal includes a receiving unit 510, a determining unit 520, and a sending unit 530.

The receiving unit 510 of the terminal is configured to receive first information on a first channel. The first information carries a first sequence of at least one second terminal, the terminal supports a first transmission technology, the second terminal supports a second transmission technology, and the first sequence of the second terminal is used to indicate that the first channel is used by a terminal that supports the second transmission technology.

The determining unit 520 is configured to determine first indication information based on the first sequence.

The sending unit 530 is configured to send the first indication information on the first channel. The first indication information is used to indicate that the first channel is used by the terminal that supports the second transmission technology.

The sending unit 530 is configured to send data by using a second channel. The data is used to communicate with another terminal that supports a same transmission technology as the terminal.

Further, the determining unit 520 is further configured to determine that a quantity of the first sequences received by the receiving unit 510 within a preset period exceeds a preset threshold. The quantity of first sequences is used to indicate a quantity of second terminals. The preset period is configured by a base station, or is preconfigured. The preset threshold is configured by the base station, or is preconfigured.

Preferably, when the information carries the first sequence of the at least one second terminal or the quantity of first sequences received by the receiving unit 510 within the first preset period exceeds the preset threshold, the receiving unit 510 is further configured to receive information on the second channel, and the sending unit 530 is further configured to send information on the second channel. The first channel and the second channel are different from each other.

It may be understood that, a mechanism used by the terminal to transmit data by using the second channel and a mechanism used by the terminal to send the first indication information on the first channel are the same. Specifically, when the first information carries the first sequence of the at least one second terminal, or the first information carries the at least one first sequence of the second terminal, and the quantity of the first sequences received within the preset period exceeds the preset threshold, the terminal sends the first indication information on the first channel, and the terminal transmits data by using the second channel. Therefore, when one of terminals that support a same transmission technology as the terminal detects a terminal that supports the second transmission technology, or detects that a quantity of terminals that support the second transmission technology meets a preset condition, all the terminals that support a same transmission technology as the terminal perform channel switching. In this embodiment of the present invention, an appropriate quantity threshold may be set to balance transmission technology interference and channel resource utilization.

Preferably, the sending unit 530 is configured to send the indication information by using a reserved resource on the first channel.

Specifically, the reserved resource is a preconfigured resource or a resource configured by the base station. The first transmission technology and the second transmission technology have different transmission priorities on the first channel.

In an example, the first transmission technology is an Internet of Vehicles LTE-V transmission technology, and the second transmission technology is a dedicated short range communications DSRC technology. A transmission priority of the LTE-V transmission technology is lower than that of the DSRC transmission technology on the first channel.

Specifically, the first indication information is a sidelink synchronization sequence on the first channel, and the sending unit 530 is configured to send the synchronization sequence on the first channel.

Specifically, the first indication information is at least one bit in sidelink broadcast information on the first channel, and the sending unit 530 is specifically configured to send the at least one bit on the first channel.

Specifically, a demodulation reference signal of a physical sidelink broadcast channel on the first channel includes the first indication information, and the sending unit 530 is specifically configured to send the demodulation reference signal on the first channel.

Specifically, a demodulation reference signal in a time-frequency resource on the first channel includes the first indication information, and the sending unit 530 is specifically configured to send the demodulation reference signal on the first channel.

Specifically, the first indication information is at least one data packet in a time-frequency resource on the first channel, and the sending unit 530 is configured to send the at least one data packet on the first channel.

Specifically, the first sequence includes one or more of the following sequences: a preamble sequence, a synchronization signal sequence, and a reference signal sequence.

Specifically, the receiving unit 510 is configured to periodically receive the first information on the first channel.

Figure 6:
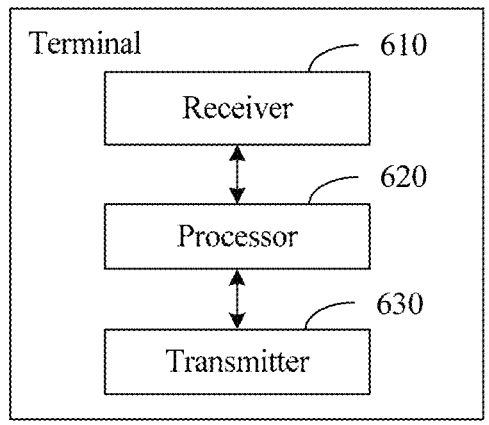
FIG. 6 is a schematic architectural diagram of another terminal according to an embodiment of the present invention.

In addition, the terminal provided in this embodiment of the present invention may be alternatively implemented in the following manner to implement the communication method in the foregoing embodiment of the present invention. As shown in FIG. 6, the terminal includes a receiver 610, a processor 620, and a transmitter 630.

The receiver 610 of the terminal is configured to receive first information on a first channel. The first information carries a first sequence of at least one second terminal, the first terminal supports a first transmission technology, the second terminal supports a second transmission technology, and the first sequence of the second terminal is used to indicate that the first channel is used by a terminal that supports the second transmission technology.

The processor 620 is configured to determine first indication information based on the first sequence.

The transmitter 630 is configured to send the first indication information on the first channel. The first indication information is used to indicate that the first channel is used by the terminal that supports the second transmission technology.

The processor 620 is further configured to determine that a quantity of first sequences received by the receiver 610 within a preset period exceeds a preset threshold. The quantity of first sequences is used to indicate a quantity of second terminals. The preset period is configured by a base station, or is preconfigured. The preset threshold is configured by the base station, or is preconfigured.

The transmitter 630 is configured to send data by using a second channel. The data is used to communicate with another terminal that uses a same transmission technology as the terminal. Preferably, when the information carries the at least one first sequence of the second terminal, or the quantity of first sequences received by the receiver 610 within the first preset period exceeds the preset threshold, the receiver 610 is further configured to receive information on the second channel, and the transmitter 630 is further configured to send information by using the second channel.

Preferably, the transmitter 630 is configured to send the indication information by using a reserved resource on the first channel.

Specifically, the reserved resource is a preconfigured resource or a resource configured by the base station. The first transmission technology and the second transmission technology have different transmission priorities on the first channel.

In an example, the first transmission technology is an Internet of Vehicles LTE-V transmission technology, and the second transmission technology is a dedicated short range communications DSRC technology. A transmission priority of the LTE-V transmission technology is lower than that of the DSRC transmission technology on the first channel.

Specifically, the first indication information is a sidelink synchronization sequence on the first channel, and the transmitter 630 is configured to send the synchronization sequence on the first channel.

Specifically, the first indication information is at least one bit in sidelink broadcast information on the first channel, and the transmitter 630 is specifically configured to send the at least one bit on the first channel.

Specifically, a demodulation reference signal of a physical sidelink broadcast channel on the first channel includes the first indication information, and the transmitter 630 is configured to send the demodulation reference signal on the first channel.

Specifically, a demodulation reference signal in a time-frequency resource on the first channel includes the first indication information, and the transmitter 630 is configured to send the demodulation reference signal on the first channel.

Specifically, the first indication information is at least one data packet in a time-frequency resource on the first channel, and the transmitter 630 is configured to send the at least one data packet on the first channel.

Specifically, the first sequence includes one or more of the following sequences: a preamble sequence, a synchronization signal sequence, and a reference signal sequence.

Specifically, the receiver 610 is specifically configured to periodically receive the first information on the first channel.

Preferably, the receiver 610 periodically receives information on the first channel. When it is detected, by determining that information received by the receiver 610 last time on the first channel carries the at least one first sequence of the second terminal, that the second terminal transmits data by using the first channel, the terminal transmits data by using the second channel. The receiver 610 of the terminal that switches to the second channel receives the information on the first channel at a specific time interval, and when it is determined that the information on the first channel does not carry the first sequence of the second terminal or the first indication information, the terminal provided in this embodiment switches from the second channel to the first channel for data transmission.

It may be understood that, FIG. 6 shows only a simplified design of the terminal. In actual application, the terminal may include any quantity of transmitters, receivers, processors, and the like. All terminals that may implement the present invention fall within the protection scope of the present invention.

Figure 7:
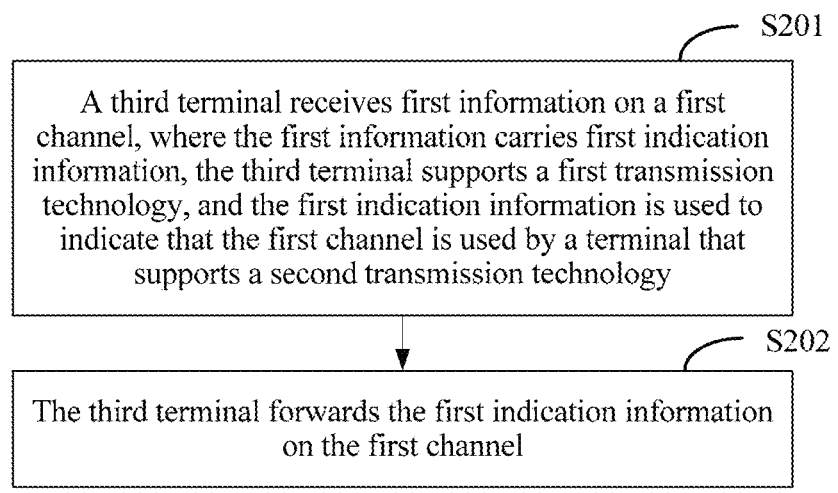
FIG. 7 is a schematic flowchart of another communication method according to an embodiment of the present invention.

In an embodiment of the present invention, a third terminal receives, on a first channel, first information that carries first indication information, forwards the first indication information on the first channel, and switches to a second channel for data transmission. A solution provided in this embodiment of the present invention is described in detail below with reference to FIG. 7. FIG. 7 is a flowchart of another communication method according to an embodiment of the present invention. In this embodiment of the present invention, the method is performed by a third terminal. As shown in FIG. 7, this embodiment specifically includes the following steps.

Step S201: The third terminal receives first information on a first channel, where the first information carries first indication information, the third terminal supports a first transmission technology, and the first indication information is used to indicate that the first channel is used by a terminal that supports a second transmission technology.

Specifically, when the first information carries the first indication information, the third terminal determines that the first channel is used by the terminal that supports the second transmission technology.

Step S202: The third terminal forwards the first indication information on the first channel.

Further, the third terminal receives information on the first channel, and when the information carries the first indication information, the third terminal transmits data by using a second channel. The third terminal sends data by using the second channel. The data sent by the third terminal on the second channel is used to communicate with another terminal that supports the first transmission technology.

Preferably, the third terminal forwards the indication information by using a reserved resource on the first channel. A resource used by the third terminal to receive the indication information on the first channel is different from a resource used by the third terminal to forward the indication information on the first channel. For example, the indication information received by the third terminal is sent or broadcast by the first terminal. If the first terminal sends or broadcasts the indication information by using a resource A in the reserved resource, the third terminal sends, forwards, or broadcasts the indication information by using a resource B in the reserved resource.

Specifically, the reserved resource is a preconfigured resource or a resource configured by a base station. The first transmission technology and the second transmission technology may have different transmission priorities on the first channel. For a specific manner of configuring the reserved resource, refer to the descriptions in the embodiment shown in FIG. 3. Details are not described herein again.

In an example, the first transmission technology is an Internet of Vehicles LTE-V transmission technology, and the second transmission technology is a dedicated short range communications DSRC technology. A transmission priority of the LTE-V transmission technology is lower than that of the DSRC transmission technology on the first channel.

According to the communication method provided in this embodiment of the present invention, after detecting, on the first channel, indication information indicating that the first channel is used by a DSRC terminal to transmit data, an LTE-V terminal forwards the indication information, and transmits data by using the second channel. Therefore, LTE-V terminals can share the information indicating that a DSRC terminal is detected. In addition, the indication information is forwarded between the LTE-V terminals, so that a problem that limited by a condition such as a distance, some LTE-V terminals fail to detect a DSRC terminal, and do not switch to the second channel in a timely manner is avoided.

It should be noted that, on a same channel, the LTE-V terminals may identify information between each other. If the LTE-V terminals fail to switch to a same channel, communication between the LTE-V terminals on different channels is interrupted. Therefore, the LTE-V terminals receive information on a plurality of channels, to avoid an information loss. According to the communication method provided in this embodiment of the present invention, the LTE-V terminals can all switch to the second channel. In addition, a channel to which the LTE-V terminals switch may be predetermined, so that the LTE-V terminals after the switching transmit data by using the same channel.

Figure 8:
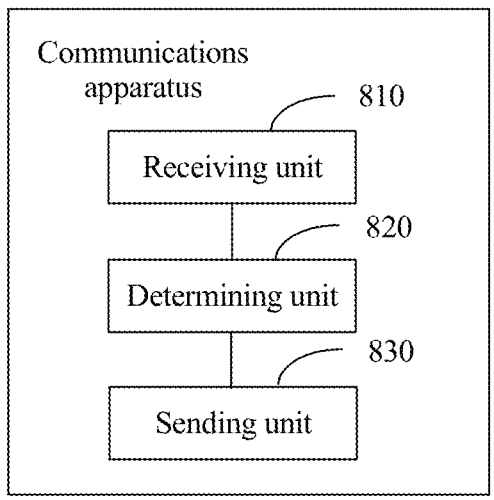
FIG. 8 is a schematic architectural diagram of still another terminal according to an embodiment of the present invention.

Correspondingly, an embodiment of the present invention provides still another terminal to implement the communication method provided in the foregoing embodiment. As shown in FIG. 8, the terminal includes a receiving unit 810, a determining unit 820, and a sending unit 830.

The receiving unit 810 of the terminal is configured to receive first information on a first channel. The first information carries first indication information, the terminal supports a first transmission technology, and the first indication information is used to indicate that the first channel is used by a terminal that supports the second transmission technology.

The determining unit 820 is configured to determine that the first channel is used by the terminal that supports the second transmission technology.

The sending unit 830 is configured to forward the first indication information on the first channel.

The sending unit 830 is configured to send data by using a second channel. The data is used to communicate with another terminal that uses a same transmission technology as the terminal.

Preferably, when the first information carries the first indication information, the receiving unit 810 is further configured to receive information on the second channel, and the sending unit 830 is further configured to send information by using the second channel.

Preferably, the sending unit 830 is specifically configured to forward the indication information by using a reserved resource on the first channel. A resource used by the terminal to receive the indication information on the first channel is different from a resource used by the terminal to forward the indication information on the first channel.

Specifically, the first indication information is a sidelink synchronization sequence on the first channel, and the sending unit 830 is specifically configured to forward the synchronization sequence on the first channel.

Specifically, the first indication information is at least one bit in sidelink broadcast information on the first channel, and the sending unit 830 is specifically configured to forward the at least one bit on the first channel.

Specifically, a demodulation reference signal of a physical sidelink broadcast channel on the first channel includes the first indication information, and the sending unit 830 is specifically configured to forward the demodulation reference signal on the first channel.

Specifically, a demodulation reference signal in a time-frequency resource on the first channel includes the first indication information, and the sending unit 830 is specifically configured to forward the demodulation reference signal on the first channel.

Specifically, the first indication information is at least one data packet in a time-frequency resource on the first channel, and the sending unit 830 is specifically configured to forward the at least one data packet on the first channel.

Specifically, the receiving unit 810 is specifically configured to periodically receive the first information on the first channel.

Figure 9:
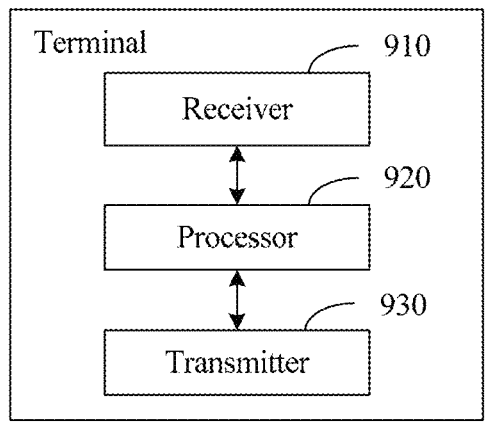
FIG. 9 is a schematic architectural diagram of yet another terminal according to an embodiment of the present invention.

In addition, the terminal provided in this embodiment of the present invention may be alternatively implemented in the following manner to implement the communication method in the foregoing embodiment of the present invention. As shown in FIG. 9, the terminal includes a receiver 910, a processor 920, and a transmitter 930.

The receiver 910 of the terminal is configured to receive first information on a first channel. The first information carries first indication information, the terminal supports a first transmission technology, and the first indication information is used to indicate that the first channel is used by a terminal that supports the second transmission technology.

The processor 920 is configured to determine that the first channel is used by the terminal that supports the second transmission technology.

The transmitter 930 is configured to forward the first indication information on the first channel.

The transmitter 930 is configured to send data by using a second channel. The data is used to communicate with another terminal that uses a same transmission technology as the terminal.

Preferably, when the first information carries the first indication information, the receiver 910 is further configured to receive information on the second channel, and the transmitter 930 is further configured to send information by using the second channel.

Preferably, the transmitter 930 is specifically configured to send the indication information by using a reserved resource on the first channel. A resource used by the terminal to receive the indication information on the first channel is different from a resource used by the terminal to forward the indication information on the first channel.

Preferably, the first indication information is a sidelink synchronization sequence on the first channel, and the transmitter 930 is specifically configured to forward the synchronization sequence on the first channel.

Preferably, the first indication information is at least one bit in sidelink broadcast information on the first channel, and the transmitter 930 is specifically configured to forward the at least one bit on the first channel.

Preferably, a demodulation reference signal of a physical sidelink broadcast channel on the first channel includes the first indication information, and the transmitter 930 is specifically configured to forward the demodulation reference signal on the first channel.

Preferably, a demodulation reference signal in a time-frequency resource on the first channel includes the first indication information, and the transmitter 930 is specifically configured to forward the demodulation reference signal on the first channel.

Preferably, the first indication information is at least one data packet in a time-frequency resource on the first channel, and the transmitter 930 is specifically configured to forward the at least one data packet on the first channel.

Preferably, the transmitter 930 is specifically configured to periodically receive the first information on the first channel.

Specifically, the reserved resource is a preconfigured resource or a resource configured by a base station. The first transmission technology and the second transmission technology may have different transmission priorities on the first channel.

In an example, the first transmission technology is an Internet of Vehicles LTE-V transmission technology, and the second transmission technology is a dedicated short range communications DSRC technology. A transmission priority of the LTE-V transmission technology is lower than that of the DSRC transmission technology on the first channel.

It may be understood that, FIG. 9 shows only a simplified design of the terminal. In actual application, the terminal may include any quantity of transmitters, receivers, processors, and the like. All terminals that may implement the present invention fall within the protection scope of the present invention.

According to the communication method provided in this embodiment of the present invention, an LTE-V terminal that receives indication information on the first channel forwards the indication information, so that more LTE-V terminals learn of, in a timely manner, information indicating that there is a DSRC terminal on the first channel, and the LTE-V terminal that receives the indication information, together with an LTE-V terminal that detects a DSRC identifier, switches to the second channel for data transmission. Therefore, energy consumption in D2D communication is reduced, and the DSRC transmission technology and the LTE-V transmission technology better coexist.

Figure 10:
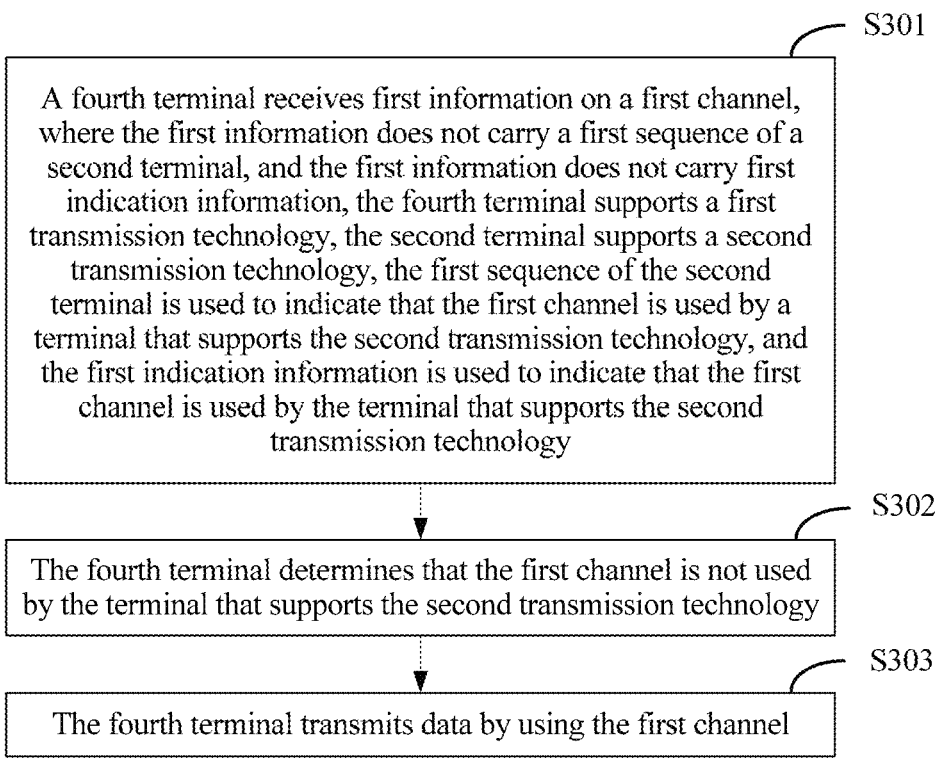
FIG. 10 is a schematic flowchart of still another communication method according to an embodiment of the present invention.

It should be noted that, in an embodiment of the present invention, a fourth terminal receives first information on a first channel, the first information does not carry first indication information and a first sequence of a second terminal, the fourth terminal determines that the first channel is not used by a terminal that supports a second transmission technology, and the fourth terminal transmits data by using the first channel. A solution provided in this embodiment of the present invention is described in detail below with reference to FIG. 10. FIG. 10 is a flowchart of still another communication method according to an embodiment of the present invention. In this embodiment of the present invention, the method is performed by a fourth terminal. As shown in FIG. 10, this embodiment specifically includes the following steps:

Step S301: The fourth terminal receives first information on a first channel, where the first information does not carry a first sequence of a second terminal, and the first information does not carry first indication information, the fourth terminal supports a first transmission technology, the second terminal supports a second transmission technology, the first sequence of the second terminal is used to indicate that the first channel is used by a terminal that supports the second transmission technology, and the first indication information is used to indicate that the first channel is used by the terminal that supports the second transmission technology.

Step S302: The fourth terminal determines that the first channel is not used by the terminal that supports the second transmission technology.

Step 303: The fourth terminal transmits data by using the first channel.

Preferably, the fourth terminal periodically receives the first information on the first channel.

In an example, the first transmission technology is an Internet of Vehicles LTE-V transmission technology, and the second transmission technology is a dedicated short range communications DSRC technology. A transmission priority of the LTE-V transmission technology is lower than that of the DSRC transmission technology on the first channel.

According to the communication method provided in this embodiment of the present invention, when there is no DSRC terminal on the first channel, an LTE-V terminal detects no DSRC terminal, and therefore the LTE-V terminal does not send indication information on a reserved resource on the first channel, and another terminal cannot detect the indication information. Therefore, all LTE-V terminals can switch back to the first channel for LTE-V communication. Whether there is a DSRC terminal on the first channel is determined by determining whether there is indication information on the first channel or whether a DSRC terminal can be detected on the first channel, so that a mechanism in which the LTE-V terminals switch from the second channel to the first channel can be implemented. Therefore, when there is no DSRC terminal on the first channel, the LTE-V terminals can efficiently switch back to the first channel, thereby increasing a capacity of an LTE-V system, and improving channel utilization.

It should be noted that, a channel to which the LTE-V terminals switch may be predetermined, so that the LTE-V terminals after the switching transmit data by using the same channel. In addition, the LTE-V terminals after the switching can communicate with each other without additionally receiving data information on an original channel or the second channel, thereby reducing energy consumption in D2D communication. The LTE-V terminals after the switching need to detect information on the original channel only at a specific time interval, and switch back to the original channel when there is no DSRC terminal on the original channel, thereby increasing the capacity of the LTE-V system, and improving channel utilization.

Figure 11:
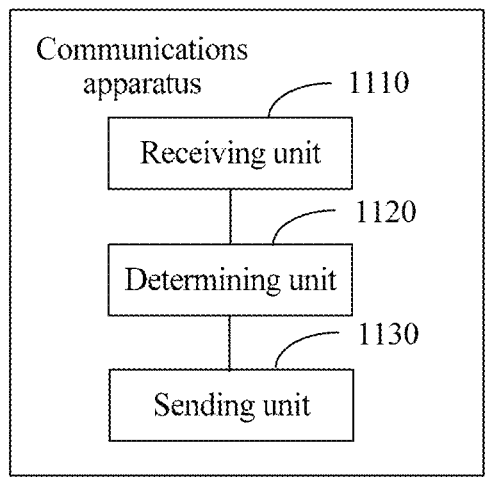
FIG. 11 is a schematic architectural diagram of yet another terminal according to an embodiment of the present invention.

Correspondingly, an embodiment of the present invention provides yet another terminal to implement the communication method provided in the foregoing embodiment. As shown in FIG. 11, the terminal includes a receiving unit 1110, a determining unit 1120, and a sending unit 1130.

The receiving unit 1110 of the terminal is configured to receive first information on a first channel. The first information does not carry a first sequence of a second terminal, and the first information does not carry first indication information, the terminal supports a first transmission technology, the second terminal supports a second transmission technology, the first sequence of the second terminal is used to indicate that the first channel is used by a terminal that supports the second transmission technology, and the first indication information is used to indicate that the first channel is used by the terminal that supports the second transmission technology.

The determining unit 1120 is configured to determine that the first channel is not used by the terminal that supports the second transmission technology, and the sending unit 1130 is configured to send information by using the first channel.

Preferably, the receiving unit 1110 is specifically configured to periodically receive the first information on the first channel.

Figure 12:
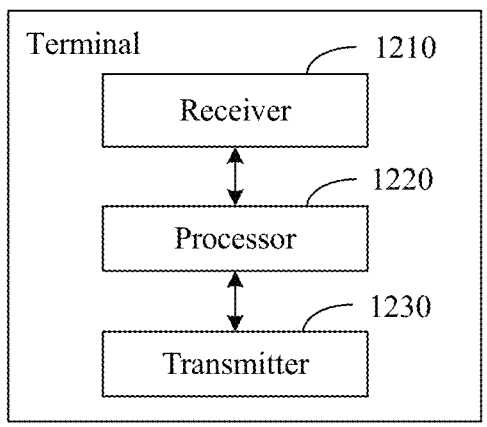
FIG. 12 is a schematic architectural diagram of still yet another terminal according to an embodiment of the present invention.

In addition, the terminal provided in this embodiment of the present invention may be alternatively implemented in the following manner to implement the communication method in the foregoing embodiment of the present invention. As shown in FIG. 12, the terminal includes a receiver 1210, a processor 1220, and a transmitter 1230.

The receiver 1210 of the terminal is configured to receive first information on a first channel. The first information does not carry a first sequence of a second terminal, and the first information does not carry first indication information, the terminal supports a first transmission technology, the second terminal supports a second transmission technology, the first sequence of the second terminal is used to indicate that the first channel is used by a terminal that supports the second transmission technology, and the first indication information is used to indicate that the first channel is used by the terminal that supports the second transmission technology.

The processor 1220 is configured to determine that the first channel is not used by the terminal that supports the second transmission technology.

The transmitter 1230 is configured to transmit data by using the first channel.

Preferably, the receiver 1210 is specifically configured to periodically receive the first information on the first channel.

It may be understood that, FIG. 12 shows only a simplified design of the terminal. In actual application, the terminal may include any quantity of transmitters, receivers, processors, and the like. All terminals that may implement the present invention fall within the protection scope of the present invention.

It should be noted that in an embodiment of the present invention, when detecting that a second terminal transmits data by using a first channel, a first terminal reports this to a base station. The base station configures the first terminal to transmit data by using a second channel. A solution provided in this embodiment of the present invention is described in detail below with reference to FIG. 13. FIG. 13 is a flowchart of yet another communication method according to an embodiment of the present invention. In this embodiment of the present invention, the method is performed by a first terminal. As shown in FIG. 13, this embodiment specifically includes the following steps:

Step S401: A base station receives information that is reported by the first terminal and indicates that a first channel is used by a terminal that supports a second transmission technology, where the first terminal supports a first transmission technology.

Step S402: The base station determines that the first channel is used by the terminal that supports the second transmission technology.

Step S403: The base station configures a terminal that supports the first transmission technology to transmit data by using a second channel, where the first channel and the second channel are different from each other.

Preferably, the first terminal receives first information on the first channel. When the first information carries a first sequence of at least one second terminal or when the first information carries at least one first sequence, and a quantity of first sequences received by the first terminal within a preset period exceeds a preset threshold, the first terminal reports, to the base station, the information indicating that the first channel is used by the terminal that supports the second transmission technology.

Specifically, a reporting mechanism used by the first terminal to report, to the base station, the information indicating that the first channel is used by the terminal that supports the second transmission technology is the same as the mechanism used by the first terminal to send the first indication information on the first channel and the mechanism used by the first terminal to transmit data by using the second channel in the embodiment shown in FIG. 3. For details, refer to the descriptions in the foregoing embodiment. Details are not described herein again.

It should be noted that the first terminal in this embodiment of the present invention, a third terminal, or a fourth terminal is any one of terminals that support the first transmission technology. The second terminal in this embodiment of the present invention is any one of terminals that support the second transmission technology.

Preferably, the base station configures, by using one or more of radio resource control (RRC), downlink control information (DCI), and a system information block (SIB), the first terminal to transmit data by using the second channel.

Figure 14:
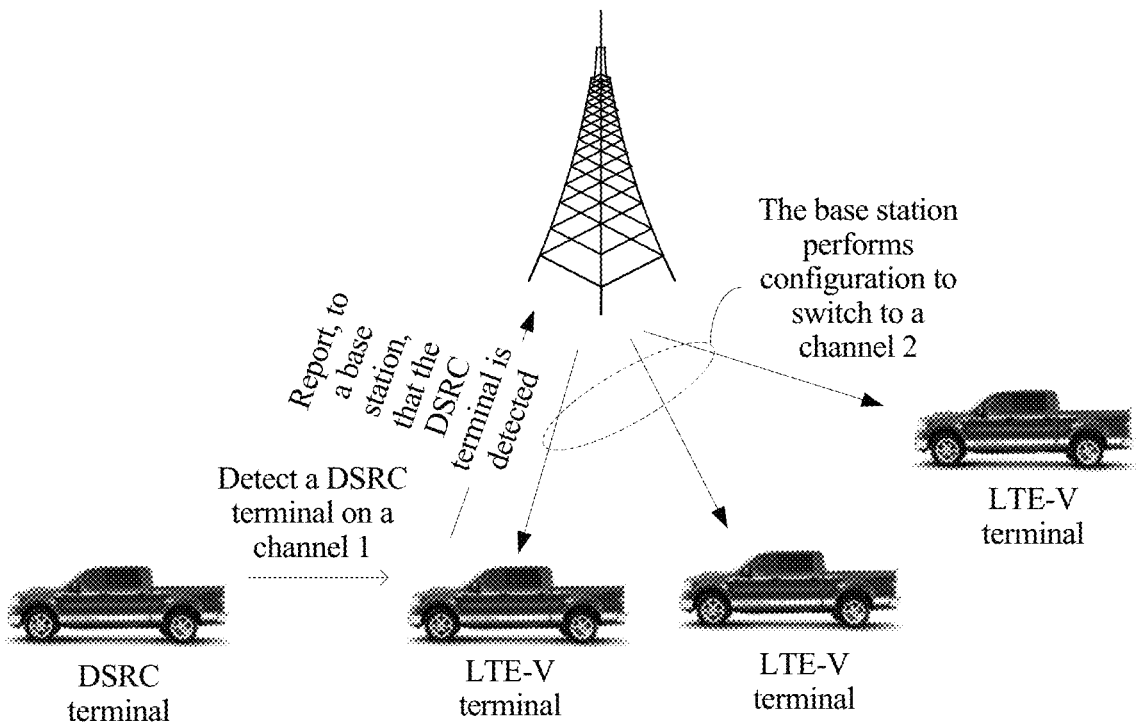
FIG. 14 is a schematic architectural diagram of another communications system according to an embodiment of the present invention.

As shown in FIG. 14, in a specific example, when an LTE-V terminal A detects at least one preamble sequence of a DSRC terminal on a channel 1, and a quantity of preamble sequences of the DSRC terminal that are detected within a preset period exceeds a preset threshold, the LTE-V terminal A sends information 1 to the base station to notify the base station that there is a DSRC terminal on the channel. After learning of the information, the base station configures the LTE-V terminal A and an LTE-B terminal B in a cell to switch to a channel 2.

The LTE-V terminal A may report the information to the base station by using an uplink control channel, a buffer status report (BSR), RRC signaling, or the like. The base station may configure, by using RRC, DCI, a SIB, or the like, a terminal in the cell to switch to the channel 2.

Optionally, in some scenarios, if necessary, the base station may notify another neighboring base station of the information 1, so that the another base station can also configure an LTE-V terminal in a cell to switch to the channel 2.

According to the communication method provided in this embodiment of the present invention, when detecting a DSRC terminal on the channel 1, an LTE-V terminal reports this to the base station, and the base station configures an LTE-V terminal in the cell of the base station to switch to the channel 2, so that an in-vehicle terminal that fails to detect a DSRC terminal or a handheld terminal without a perception capability can also switch to the channel 2. In this embodiment of the present invention, LTE-V terminals in the cell of the base station all switch to the channel 2 through configuration by the base station.

Preferably, when the base station does not receive, within the preset period, the information that is reported by the first terminal and indicates that the first channel is used by the terminal that supports the second transmission technology, the base station configures the terminal that supports the first transmission technology to transmit data by using the first channel.

In a specific example, when detecting a DSRC terminal on the channel 1, the LTE-V terminal periodically reports the information to the base station. When detecting no DSRC terminal, the LTE-V terminal does not report information. A detection period or a reporting period is preconfigured, or is configured by the base station. For example, reporting is performed each 100 ms. When receiving, within a time interval, no information that is reported by the terminal and indicates existence of a DSRC terminal, the base station sends configuration information, so that the LTE-V terminal in the cell switches back to the channel 1. The time interval is preconfigured, or is determined by the base station, for example, 1 second.

It may be understood that, that reporting is performed each 100 ms may be understood as that before performing reporting each 100 ms, the terminal (for example, the LTE-V terminal) detects whether there is a DSRC terminal on the channel 1, and reports a detection result.

According to the communication method provided in this embodiment of the present invention, when the base station does not receive, within the preset period, the information that is reported by the terminal and indicates that a DSRC terminal is detected on the channel 1, the base station configures the LTE-V terminal to switch from the channel 2 back to the channel 1. Therefore, a problem of how the LTE-V terminal switches from the channel 2 back to the channel 1 when there is no DSRC terminal on the channel 1 is resolved.

It may be understood that the DSRC terminal and the LTE-V terminal in this embodiment of the present invention may be interchanged. For example, when detecting an LTE-V terminal on the first channel, a DSRC terminal may send, on the first channel, indication information indicating that there is an LTE-V terminal on the first channel, and switch to the second channel for data transmission, and another DSRC terminal may switch to the second channel for data transmission based on the indication information. Further, according to the method provided in this embodiment of the present invention, a problem of how the DSRC terminal switches back to the original channel can be further resolved, and a capacity of a DSRC system can be increased. According to the communication method provided in this embodiment of the present invention, a terminal that uses a low-priority transmission technology is not limited to perform switching, and this embodiment of the present invention is intended to resolve a problem of mutual interference between two transmission technologies. Therefore, a person skilled in the art may understand that all technical solutions in which variations of this embodiment of the present invention are used to achieve a same technical effect shall fall within the protection scope of this embodiment of the present invention.

According to the communication method and the terminal provided in the embodiments of the present invention, with reference to the broadcast manner in which a terminal sends information to a surrounding terminal and the communication mode in which a terminal forwards information to a surrounding terminal by using the base station in D2D communication, the embodiments of the present invention resolve a problem that an LTE-V terminal that fails to detect a DSRC terminal and an LTE-V terminal that detects a DSRC terminal perform communication on different channels and a problem of how an LTE-V terminal switches back to an original channel when there is no DSRC terminal on the original channel. According to the communication method and the terminal provided in the embodiments of the present invention, the DSRC transmission technology and the LTE-V transmission technology can better coexist, and transmission interruption caused because some terminals fail in switching when one transmission technology detects the other transmission technology can be avoided. Therefore, energy consumption in D2D communication can be reduced, a capacity of a communications system can be increased, and channel utilization can be improved.

Further, according to the communication method and the terminal provided in the embodiments of the present invention, it may be preset that when a quantity of DSRC terminals detected by an LTE-V terminal on the first channel exceeds a specific quantity, the LTE-V terminal sends first indication information on the first channel, and the LTE-V terminal switches to the second channel for data transmission. In the solution, when the quantity of DSRC terminals does not exceed the specific quantity, there is some interference between the DSRC transmission technology and the LTE-V transmission technology. However, a problem that after the LTE-V terminal performs switching, excessive resources on the first channel are left unused because of an excessively small quantity of DSRC terminals can be avoided in the solution. In the embodiments of the present invention, an appropriate quantity threshold may be set to balance transmission technology interference and channel resource utilization.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Persons of ordinary skill in the art may understand that all or some of the steps in each of the foregoing method of the embodiments may be implemented by a program instructing a processor. The foregoing program may be stored in a computer readable storage medium. The storage medium may be a non-transitory medium, such as a random access memory, read-only memory, a flash memory, a hard disk, a solid state drive, a magnetic tape, a floppy disk, an optical disc, or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal, wherein the terminal comprises:
a receiver, configured to receive first information on a first channel, wherein the terminal is a first terminal, and the first information carries a first sequence of at least one second terminal, the first terminal supporting a first transmission technology, the at least one second terminal supporting a second transmission technology, and the first sequence of the at least one second terminal indicating that the first channel is used by a given terminal that supports the second transmission technology;
a processor configured to determine first indication information based on the first sequence; and
a transmitter configured to send the first indication information on the first channel, wherein the first indication information indicates that the first channel is used by the given terminal that supports the second transmission technology; and, wherein the processor is further configured to determine that a quantity of the first sequence of the at least one second terminal received by the receiver within a preset period exceeds a preset threshold, wherein the quantity of the first sequence indicates a quantity of the at least one second terminal.

2. The terminal according to claim 1, wherein the receiver is further configured to receive information on a second channel, and the transmitter is further configured to send information on the second channel, wherein the first channel and the second channel are different from each other.

3. The terminal according to claim 1, wherein
the first indication information is a sidelink synchronization sequence on the first channel; and, wherein
the transmitter is configured to send the synchronization sequence on the first channel.

4. The terminal according to claim 1, wherein
the first indication information is at least one bit in sidelink broadcast information on the first channel; and, wherein
the transmitter is specifically configured to send the at least one bit on the first channel.

5. The terminal according to claim 1, wherein
a demodulation reference signal of a physical sidelink broadcast channel on the first channel comprises the first indication information; and, wherein
the transmitter is configured to send the demodulation reference signal on the first channel.

6. The terminal according to claim 1, wherein
a demodulation reference signal in a time-frequency resource on the first channel comprises the first indication information; and, wherein
the transmitter is configured to send the demodulation reference signal on the first channel.

7. The terminal according to claim 1, wherein
the first indication information includes at least one data packet in a time-frequency resource on the first channel; and
the transmitter is configured to send the at least one data packet on the first channel.

8. The terminal according to claim 1, wherein the first sequence comprises one or more of the following sequences:
a preamble sequence, a synchronization signal sequence, and a reference signal sequence.

9. The terminal according to claim 1, wherein the receiver is configured to periodically receive the first information on the first channel.

10. A terminal, wherein the terminal comprises:
a receiver, configured to receive first information on a first channel, wherein the first information carries first indication information, the terminal supports a first transmission technology, and the first indication information indicates that the first channel is used by at least one second terminal that supports a second transmission technology;
a processor configured to determine that the first channel is used by the terminal that supports the second transmission technology; and
a transmitter configured to forward the first indication information on the first channel; and, wherein the processor is further configured to determine that a quantity of a first sequence of the at least one second terminal received by the receiver within a preset period exceeds a preset threshold, wherein the quantity of the first sequence indicates a quantity of the at least one second terminal.

11. The terminal according to claim 10, wherein the receiver is further configured to receive information on a second channel, and the transmitter is further configured to send information on the second channel, wherein the first channel and the second channel are different from each other.

12. The terminal according to claim 10, wherein a resource used by the terminal to receive the indication information on the first channel is different from a resource used by the terminal to forward the indication information on the first channel.

13. The terminal according to claim 10, wherein
the first indication information is a sidelink synchronization sequence on the first channel; and, wherein
the transmitter is configured to forward the synchronization sequence on the first channel.

14. The terminal according to claim 10, wherein
the first indication information is at least one bit in sidelink broadcast information on the first channel; and, wherein
the transmitter is configured to forward the at least one bit on the first channel.

15. The terminal according to claim 10, wherein
a demodulation reference signal of a physical sidelink broadcast channel on the first channel comprises the first indication information; and, wherein
the transmitter is configured to forward the demodulation reference signal on the first channel.

16. The terminal according to claim 10, wherein
a demodulation reference signal in a time-frequency resource on the first channel comprises the first indication information; and, wherein
the transmitter is configured to forward the demodulation reference signal on the first channel.

17. The terminal according to claim 10, wherein
the first indication information is at least one data packet in a time-frequency resource on the first channel; and, wherein
the transmitter is configured to forward the at least one data packet on the first channel.

18. The terminal according to claim 10, wherein the receiver is configured to periodically receive the first information on the first channel.

\* \* \* \* \*